(12) United States Patent
Zhang

(10) Patent No.: US 6,855,659 B1
(45) Date of Patent: Feb. 15, 2005

(54) MANUFACTURING METHOD OF CARBON NANOTUBES AND LASER IRRADIATION TARGET FOR THE MANUFACTURE THEREOF

(75) Inventor: Yuegang Zhang, Tokyo (JP)

(73) Assignee: NEC Corporation, Tokyo (JP)

( * ) Notice: Subject to any disclaimer, the term of this patent is extended or adjusted under 35 U.S.C. 154(b) by 222 days.

(21) Appl. No.: 09/665,679

(22) Filed: Sep. 20, 2000

(30) Foreign Application Priority Data

Sep. 22, 1999 (JP) .......................................... 11/305896

(51) Int. Cl.$^7$ ............................................. B01J 21/18
(52) U.S. Cl. ...................... 502/185; 502/182; 252/503
(58) Field of Search ......................... 423/445 R, 445 B; 252/506, 503; 502/182, 185

(56) References Cited

U.S. PATENT DOCUMENTS

| | | | |
|---|---|---|---|
| 5,470,680 A | * 11/1995 | Loutfy et al. ............... | 423/439 |
| 5,997,832 A | * 12/1999 | Lieber et al. ............... | 423/440 |
| 6,228,498 B1 | * 5/2001 | Yokogawa et al. ......... | 428/408 |

FOREIGN PATENT DOCUMENTS

| | | |
|---|---|---|
| JP | 10-273308 | 10/1998 |
| JP | 11-116218 | 4/1999 |
| JP | 11-180707 | 7/1999 |

OTHER PUBLICATIONS

Pradeep, T. et al. 'A Novel $FeC_{60}$ Adduct in the Solid State' in JACS vol. 114 pp. 2272–2273 (1992), no month 1992.*

Thess et al., 'Crystalline Ropes of Metallic Carbon Nanotubes' in *Science* vol. 273 pp. 483–487 Jul. 26, 1996.*

Roberts & Caseria, *Basic Principle of Organic Chemistry* 2nd ed. 1977 p. 1505, 1977 no month.*

Andreas Thess et al., "Crystalline Ropes of Metallic Carbon Nanotubes", Science, vol. 273, Jul. 26, 1996, pp. 483–487.

Shunji Bandow et al., "Effect of the Growth Temperature on the Diameter Distribution and Chirality of Single–Wall Carbon Nanotubes", The American Physical Society, vol. 80, No. 17, Apr. 27, 1998, pp. 3779–3782.

Masako Yudasaka et al., "Roles of Laser Light and Heat in Formation of Single–Wall Carbon Nanotubes by Pulsed Laser Ablation of CxNiyCoy Targets at High Temperature", The American Physical Society, J. Phys. Chem. B 1998, 102, 10201–10207.

W.K. Maser et al., "Production of High–Density Single––Walled Nanotube Material by a Simple Laser–Ablation Method", Chemical Physics Letters 292 (1998), pp. 587–593.

F. Kokai et al., "Growth Dynamics of Single–Wall Carbon Nanotubes Synthesized by CO2 Laser Vaporization", The American Physical Society, J. Phys. Chem. B 1999, 103, pp. 4346–4351.

L.P. Biro, et al., "Growth of Carbon Nanotubes by Fullerene decomposition in the Presence of Transition Metals", Chemical Physics Letters 306 (1999), pp. 155–162.

A.M. Rao et al., "Diameter–Selective Raman Scattering from Vibrational Modes in Carbon Nanotubes", Science, vol. 275, Jan. 10, 1997, pp. 187–191.

\* cited by examiner

*Primary Examiner*—Stuart Hendrickson
(74) *Attorney, Agent, or Firm*—McGinn & Gibb, PLLC

(57) ABSTRACT

In a manufacturing method of carbon nanotubes by means of laser ablation, carbon molecules having 5-memberd carbon ring bonds (bonds of the pentagon of the fullerenes ($C_{60}$, $C_{70}$, $C_{76}$, etc.)) are included at least in part of the laser irradiation target. By use of such laser irradiation targets, single-wall carbon nanotubes can be formed efficiently in a low temperature process of 500° C. or lower (at 400° C., for example). Carbon molecules having curved surfaces, such as carbon molecules having fullerene bonds, are preferably used in the laser irradiation target. As the carbon molecule having the fullerene bonds, a carbon molecule having a spherical surface, such as the $C_{60}$ molecule, is preferably used. By use of such a laser irradiation target in a laser ablation process, single-wall carbon nanotubes can be formed efficiently in a low temperature process (at 400° C., for example). Catalysts such as Ni and Co (Ni+Co: 5 at %, for example) are preferably used for the efficient formation of the single-wall carbon nanotubes. The manufacturing method can be conducted by use of simple production equipment such as a short pulse-width laser ablation apparatus, therefore, the production of the single-wall carbon nanotubes can be conducted efficiently with a low cost.

15 Claims, 3 Drawing Sheets

F I G. 2
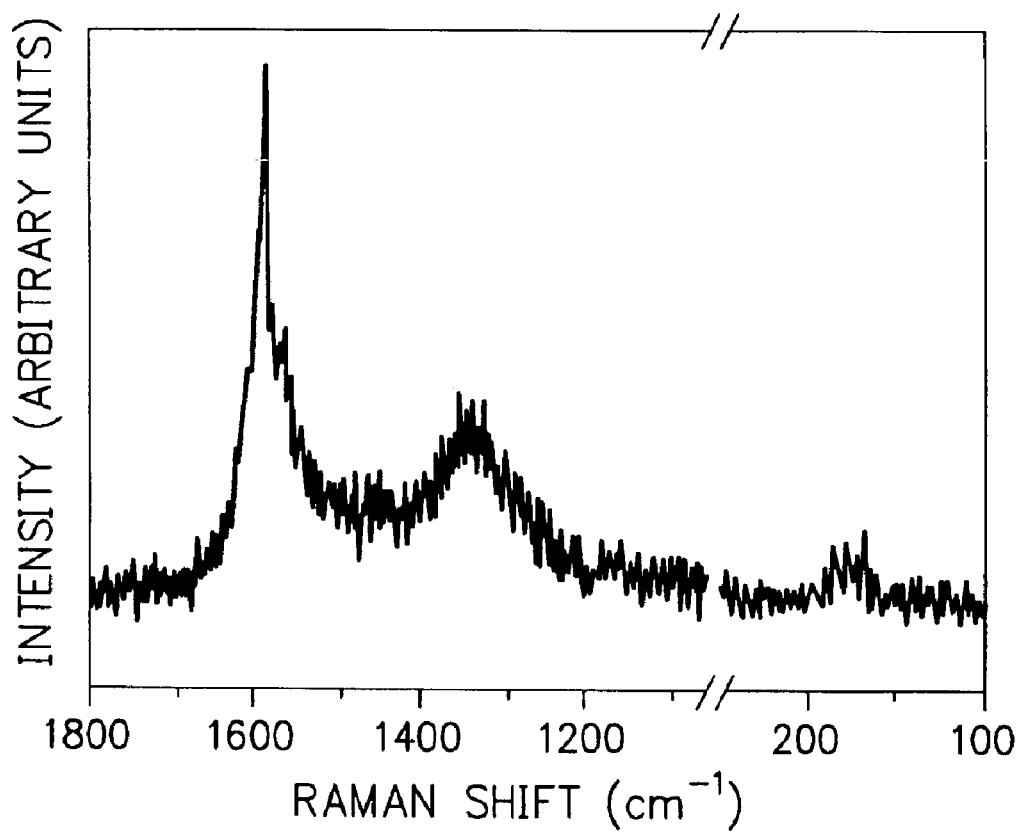

MANUFACTURING METHOD OF CARBON NANOTUBES AND LASER IRRADIATION TARGET FOR THE MANUFACTURE THEREOF

BACKGROUND OF THE INVENTION

The present invention relates to a manufacturing method of carbon nanotubes and a laser irradiation target which is used for the manufacture of the carbon nanotubes, and in particular, to a manufacturing method of carbon nanotubes and a laser irradiation target by which the carbon nanotubes can be generated efficiently at low temperatures.

Description of the Related Art

The carbon nanotube was discovered in 1991 and the structure of a single-wall carbon nanotube (SWCNT) was identified in 1993. Since the discovery of the single-wall carbon nanotube, various methods have been extensively applied to the synthesis of the single-wall carbon nanotubes.

In a document: A. Thess, R. Lee, P. Nikolaev, H. Dai, P. Petit, J. Robert, C. Xu, Y. H. Lee, S. G. Kim, A. G. Rinzler, D. T. Colbert, G. E. Scuseria, D. Tomanek, J. E. Fischer, and R. E. Smalley "Crystalline Ropes of Metallic Carbon Nanotubes", Science 273, 483 (1996), a laser ablation technique by use of a Nb-YAG short (narrow) pulse laser of a pulse width of nanosecond level was employed for the formation of the single-wall carbon nanotubes. According to documents: S. Bandow, S. Asaka, Y. Saito, A. M. Rao, L. Grigorian, E. Richter, and P. C. Eklund "Effect of the Growth Temperature on the Diameter Distribution and Chirality of Single-Wall Carbon Nanotubes", Phys. Rev. Lett. 80, 3779 (1998), M. Yudasaka, T. Ichihashi, and S. Iijima "Roles of Laser Light and Heat in Formation of Single-Wall Carbon Nanotubes by Pulsed Laser Ablation of $C_xNi_yCo_y$ Targets at High Temperature", J Phys. Chem. B102, 10201 (1998), etc., when graphite/metal materials are used for the laser irradiation target in the pulsed laser ablation, a high temperature process of 1100° C. or higher becomes necessary. Yield decreases rapidly if the temperature becomes lower than 850° C., and the formation of bundles of the single-wall carbon nanotubes becomes impossible below 600° C.

However, some reports of these days say that the single-wall carbon nanotubes can also be formed at room temperature by use of a CW (Continuous Wave) $CO_2$ laser beam and a long pulse $CO_2$ laser beam of higher powers (peak power: 1 kW, pulse width: 20 ms). Such results have been disclosed in documents: W. K. Maser, E. Munoz, A. M. Benito, M. T. Martinez, G. F. de la Funte, Y. Maniette, E. Anglaret, and J.-L. Sauvajol "Production of High-Density Single-Walled Nanotube Material by a Simple Laser-Ablation Method", Chem. Phys. Lett. 292, 587 (1998), F. Kokai, K. Takahashi, M. Yudasaka, R. Yamada, T. Ichihashi, and S. Iijima "Growth Dynamics of Single-Wall Carbon Nanotubes Synthesized by $CO_2$ Laser Vaporization", J. Phys. Chem. B103, 4346 (1999), etc.

Meanwhile, in an experiment described in a document: L. P. Biro, R. Ehlich, R. Tellgmann, A. Gromov, N. Krawez, M. Tschaplyguine, M. M. Pohl, E. Zsoldos, Z. Vertesy, Z. E. Horvath, and E. E. B. Campbell "Growth of Carbon Nanotubes by Fullerene Decomposition in the Presence of Transition Metals", Chem. Phys. Lett. 306, 155 (1999), structure like multiwall carbon nanotubes has been generated on an HOPG (Highly Oriented Pyrolytic Graphite) substrate by leading $C_{60}$ molecules into a stainless oven at 450° C.

As described above, in the conventional laser ablation techniques, it has been difficult to obtain the single-wall carbon nanotubes in a low temperature process around room temperature by use of a short pulse laser. For the formation of the nanotube structure, kinetic energy of each carbon species for forming the nanotube structure has to be maintained at a high level, and thus the cooling rate in the pulsed laser ablation process is not allowed to be large. Therefore, the formation of the single-wall carbon nanotubes in a low temperature process by use of a short pulse laser has been difficult. However, high temperature processing is not suitable for manufacturing electronic circuit chips including the single-wall carbon nanotubes.

Meanwhile, a long pulse-width high power laser, which requires a large-scale apparatus, is also not suitable as general production equipment of the single-wall carbon nanotubes.

Some attempts have been made to form the single-wall carbon nanotubes in low temperature process by methods other than the laser ablation method, however, there are many restrictions on substrates, equipment, etc., and thus such methods are not suitable for the production of pure single-wall carbon nanotubes. To sum up, in the production of the single-wall carbon nanotubes by use of the short pulse-width laser ablation method, how to lower the process temperature is a problem to be solved today.

In Japanese Patent Application Laid-Open No.HEI10-273308, when a target which is formed of graphite powder is irradiated with a laser beam and thereby carbon nanotubes are formed, the diameter of the generated carbon nanotube is controlled by varying the atmosphere temperature around the laser-irradiated part of the target. However, no disclosure has been made in the document with regard to laser targets other than the target which is formed of graphite powder.

In Japanese Patent Application Laid-Open No.HEI11-116218, in the production of the single-wall carbon nanotubes, the laser target is implemented by a target which is formed by letting graphite powder grow from seeds or kernels of metal particles, however, similarly to the above technique, no disclosure has been made on laser targets other than the graphite powder target.

In Japanese Patent Application Laid-Open No.HEI11-180707, in the production of the carbon nanotubes by use of the laser ablation method, a graphite pellet (a pellet formed of graphite powder) and a catalytic metal pellet are manufactured separately and used simultaneously, however, similarly to the above techniques, no disclosure has been made on carbon laser targets other than the graphite powder target.

SUMMARY OF THE INVENTION

It is therefore the primary object of the present invention to provide a manufacturing method of carbon nanotubes by which single-wall carbon nanotubes can be generated in a relatively low temperature process by use of simple production equipment.

Another object of the present invention is to provide a laser target which is used for the manufacture of the carbon nanotubes, by which single-wall carbon nanotubes can be generated in a relatively low temperature process.

In accordance with a first aspect of the present invention, there is provided a manufacturing method of carbon nanotubes by means of laser ablation, in which carbon molecules having 5-memberd carbon ring bonds are included at least in part of a laser irradiation target.

In accordance with a second aspect of the present invention, in the first aspect, carbon molecules having fullerene bonds are included in the laser irradiation target.

In accordance with a third aspect of the present invention, in the first aspect, $C_{60}$ molecules are used as the carbon molecules having 5-memberd carbon ring bonds.

In accordance with a fourth aspect of the present invention, in the first aspect, a short pulse-width laser is used for the laser ablation.

In accordance with a fifth aspect of the present invention, in the first aspect, one or more catalysts are used in the laser ablation.

In accordance with a sixth aspect of the present invention, in the fifth aspect, one or more catalysts are included in the laser irradiation target including the carbon molecules having 5-memberd carbon ring bonds.

In accordance with a seventh aspect of the present invention, in the sixth aspect, the catalysts include Ni and/or Co.

In accordance with an eighth aspect of the present invention, in the seventh aspect, the total amount of the Ni and/or Co in the laser irradiation target is set between 4.5 at % and 5.5 at %.

In accordance with a ninth aspect of the present invention, in the first aspect, the laser ablation is conducted in a low temperature process.

In accordance with a tenth aspect of the present invention, in the ninth aspect, the laser ablation is conducted at temperature of 500° C. or lower.

In accordance with an eleventh aspect of the present invention, in the tenth aspect, the laser ablation is conducted at temperature between 350° C. and 450° C.

In accordance with a twelfth aspect of the present invention, in the first aspect, the carbon nanotubes are single-wall carbon nanotubes.

In accordance with a thirteenth aspect of the present invention, there is provided a laser irradiation target for the manufacture of carbon nanotubes by means of laser ablation. The laser irradiation target is formed so as to include carbon molecules having 5-memberd carbon ring bonds.

In accordance with a fourteenth aspect of the present invention, in the thirteenth aspect, the laser irradiation target includes carbon molecules having fullerene bonds.

In accordance with a fifteenth aspect of the present invention, in the thirteenth aspect, $C_{60}$ molecules are used as the carbon molecules having 5-memberd carbon ring bonds.

In accordance with a sixteenth aspect of the present invention, in the thirteenth aspect, one or more catalysts are included in the laser irradiation target.

In accordance with a seventeenth aspect of the present invention, in the thirteenth aspect, the catalysts include Ni and/or Co.

In accordance with an eighteenth aspect of the present invention, in the seventeenth aspect, the total amount of the Ni and/or Co in the laser irradiation target is set between 4.5 at % and 5.5 at %.

BRIEF DESCRIPTION OF THE DRAWINGS

The objects and features of the present invention will become more apparent from the consideration of the following detailed description taken in conjunction with the accompanying drawings, in which:

FIG. 2 is a graph showing the result of Raman spectroscopy analysis which was conducted for carbon nanotubes which were generated according to the manufacturing method in accordance with the embodiment of the present invention;

DESCRIPTION OF THE PREFERRED EMBODIMENTS

Figure 1:
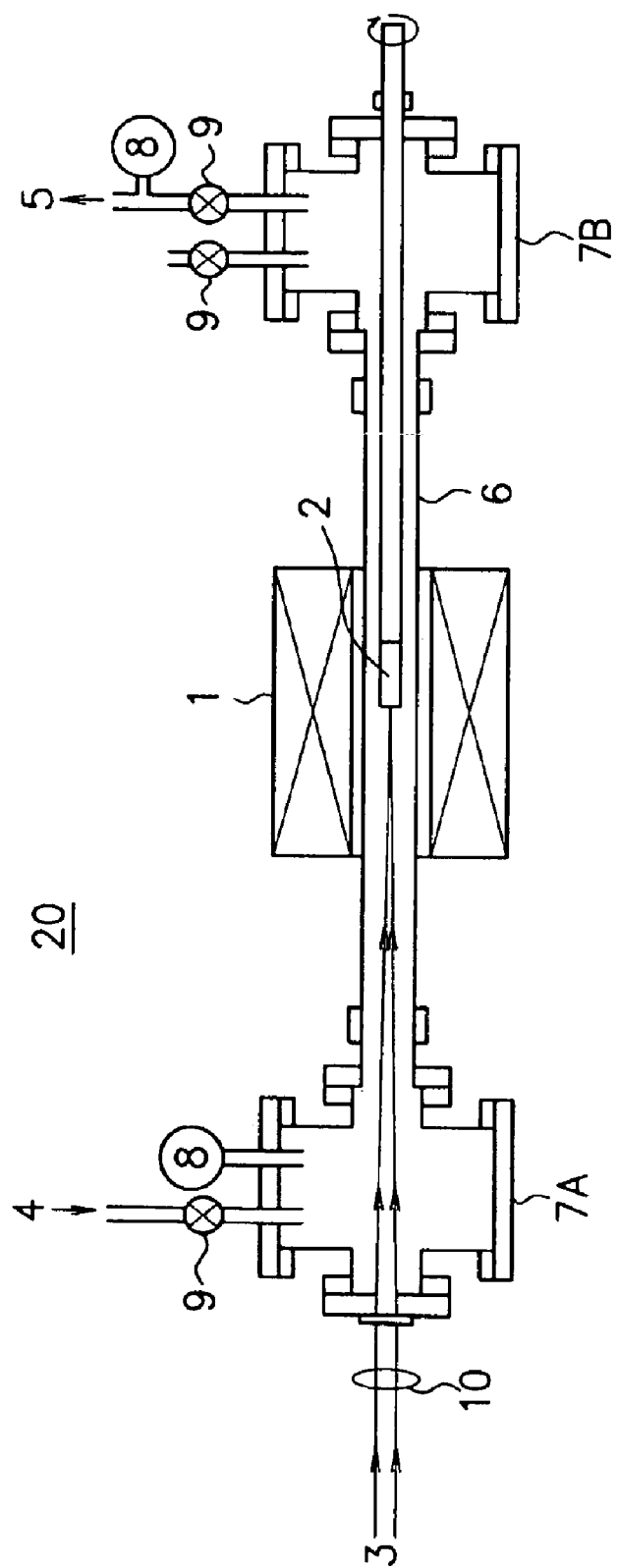
In FIG. 1 is a cross sectional view showing an example of a laser ablation apparatus which can be used for implementing a manufacturing method of carbon nanotubes in accordance with an embodiment of the present invention.

Referring now to the drawings, a description will be given in detail of preferred embodiments in accordance with the present invention.

FIG. 1 is a cross sectional view showing an example of a laser ablation apparatus which can be used for implementing a manufacturing method of carbon nanotubes in accordance with an embodiment of the present invention.

The laser ablation apparatus 20 shown in FIG. 1 includes two vacuum chambers 7A and 7B, a tube 6, a heater 1 and a laser irradiation target 2. The tube 6 such as a quarts tube hermetically connects the vacuum chambers 7A and 7B together. The heater 1, which is implemented by an electric furnace for example, is provided to the tube 6 so as to surround at least part of the tube 6. The laser irradiation target 2 is placed inside the part of the tube 6 that is surrounded by the heater 1.

The vacuum chamber 7A is provided with a gas inlet pipe 4 with a valve 9 so that inert gas such as argon gas can be supplied to inside the vacuum chamber 7A and the tube 6. On the other hand, the vacuum chamber 7B is provided with a gas outlet pipe 5 with a valve 9 so that the inert gas inside the tube 6 and the vacuum chamber 7B can be leaked and thereby the inert gas can flow along the tube 6.

A laser beam 3 is let into the vacuum chamber 7A through a lens 10 and a window of the vacuum chamber 7A, and the laser irradiation target 2 inside the tube 6 is irradiated with the laser beam 3.

The manufacturing method of carbon nanotubes in accordance with the present invention can be implemented by use of such an ordinary laser ablation apparatus. In the embodiment of the present invention, a short pulse-width laser beam can preferably be used as the laser beam 3, and 5-memberd carbon ring bonds (that is, bonds of the 5-memberd carbon rings (the pentagons of the fullerenes ($C_{60}$, $C_{70}$, $C_{76}$, etc.))) are at least included in the laser irradiation target 2. Carbon molecules having curved surfaces, such as carbon molecules having fullerene bonds, are preferably used in the laser irradiation target 2 of the present invention. As the carbon molecule having fullerene bonds, a carbon molecule having a spherical surface, such as a $C_{60}$ molecule, is preferable.

Tu sum up, the laser irradiation target 2 which is used in the manufacturing method of carbon nanotubes in accordance with the present invention is formed at least including the aforementioned 5-memberd carbon ring bonds. By use of such a laser irradiation target 2, the formation of the single-wall carbon nanotubes can easily be attained in a low temperature process.

The "fullerene bonds" which are used in the present invention are formed including the aforementioned 5-memberd carbon ring bonds and 6-memberd carbon ring bonds (that is, bonds of the 6-memberd carbon rings (the hexagons of the fullerenes ($C_{60}$, $C_{70}$, $C_{76}$, etc.))). The shape of the carbon molecule having the fullerene bonds is not limited to a sphere, but can have various shapes as long as the 5-memberd carbon ring bonds and the 6-memberd carbon ring bonds are included.

When the carbon molecules having the fullerene bonds are used for the laser irradiation target 2, the effects of the present invention are attained due to the existence of the 5-memberd carbon ring bonds. As the most preferable carbon molecule having the fullerene bonds, a spherical carbon molecule which can contain the largest number (highest percentage) of 5-memberd carbon ring bonds, the $C_{60}$ molecule, can be used.

In the manufacturing method of carbon nanotubes in accordance with the present invention, it is preferable that some specific catalysts should be used in the laser irradiation target 2 containing the 5-memberd carbon ring bonds. As the catalysts to be contained in the laser irradiation target 2, one or more transition metals such as Ni and Co can be employed. A mixture of Ni and Co can preferably be used. Preferably, the total amount of the Ni and Co (Ni+Co) should be set around 5 at % (4.5 at %~5.5 at %, for example).

While the catalysts are preferably included in the laser irradiation target 2 containing the 5-memberd carbon ring bonds, it is also possible to prepare another catalytic metal target separately and use the catalytic metal target and the laser irradiation target 2 containing the 5-memberd carbon ring bonds simultaneously.

By the setup according to the present invention which has been described above, the single-wall carbon nanotubes can be generated by use of simple production equipment in a relatively low temperature process of 500° C. or lower. From the viewpoints of the yield of the single-wall carbon nanotubes and the quality of electronic circuit chips including the single-wall carbon nanotubes, the process temperature should preferably be set around 400° C. (350° C.~450° C., for example).

The reason or mechanism of the successful and efficient formation of single-wall carbon nanotubes at low temperatures by use of the above setup in accordance with the present invention is not clear at this stage, however, the following guesses can be made.

As described above, in the manufacturing method of carbon nanotubes in accordance with the present invention, non-graphite materials are used for the laser irradiation target 2, instead of the graphite-based materials which have generally been used. As the non-graphite materials, carbon molecules having the 5-memberd carbon ring bonds or the fullerene bonds are used, and the $C_{60}$ molecules are the most preferably used as the carbon molecules having the fullerene bonds. One or more catalytic transition metals such as Ni and Co (Ni+Co: 4.5 at %~5.5 at %, for example) are preferably added to the laser irradiation target 2.

In a laser ablation method, when a laser target is irradiated with a laser beam and thereby carbon species are generated and outputted first from the laser target, the types of the carbon species and the kinetic energy of the carbon species would be different depending on the materials of the laser target (between the case where the laser target is formed of the conventional graphite-based materials and the case where the laser irradiation target 2 is formed by use of the non-graphite materials such as $C_{60}$ molecules), due to the difference of binding statuses of the laser targets.

For example, the C—C binding energy on a 5-memberd carbon ring included in the $C_{60}$ molecule is smaller than that on a 6-memberd carbon ring (benzene ring), and thus the C—C bond on the 5-memberd carbon ring seems to be more apt to be broken in comparison with the C—C bond on the 6-memberd carbon ring. Therefore, some types of combined matter such as dimers, which help the formation of the nanotube structure, would be generated in larger quantities if the 5-memberd carbon rings are included in the laser irradiation target 2.

If we assume that the absorption of laser energy into a laser target is constant regardless of the materials of the laser target, the kinetic energy of the carbon species generated from a $C_{60}$ molecule included in the laser irradiation target 2 would be larger than that of carbon species generated from the graphite structure composed of the 6-memberd carbon rings only.

The higher kinetic energy in the case of the 5-memberd carbon rings would help the growth of the carbon nanotubes for the following two reasons:

First, as the kinetic energy of each carbon species becomes higher, the probability of collisions between the carbon species becomes higher. The high collision probability is essential for mass transfer in the growth of the carbon nanotubes.

Second, the higher kinetic energy seems to promote the decomposition of relatively large fragments of the laser irradiation target 2 generated by the laser ablation into carbon species which are appropriate for the formation of the nanotube structure.

By the above reasons or mechanisms, the setup in accordance with the present invention seems to be more advantageous than the conventional laser ablation methods for the formation of the single-wall carbon nanotubes in low temperature conditions.

In the following, a concrete example of an experiment for forming the single-wall carbon nanotubes which has been conducted by the present inventor will be described in detail.

The laser ablation method in accordance with the present invention was conducted by use of a laser ablation apparatus 20 which has been shown in FIG. 1. The quartz tube 6 was heated by the heater 1 and the temperature around the laser irradiation target 2 was maintained at 400° C. Argon gas was used as the inert gas inside the quartz tube 6, and the gas flow was set to 300 sccm. Argon gas pressure in the quartz tube 6 was maintained at approximately 600 torr during the laser ablation process. A Nd-YAG laser of a pulse width of 8 ns was used for the emission of the laser beam 3. The second harmonic of the laser beam 3 was controlled so that energy density of the laser beam on the surface of the laser irradiation target 2 will be 3 $J/cm^2$ per pulse.

As the laser irradiation target 2, pure polycrystalline powder of $C_{60}$ (95 at %) and catalytic (Ni+Co) powder (5 at %) were mixed together and pressed and thereby a pellet (diameter: 1 cm, thickness: 5 mm) was prepared. The laser pulse outputted by the Nd-YAG laser was applied to the laser irradiation target 2 for 2000 times.

After the laser irradiation, soot-like matter (single-wall carbon nanotubes) sticking to the inner surface of the quartz tube 6 was gathered, and Raman spectroscopy analysis and TEM (Transmission Electron Microscopy) observation were conducted.

FIG. 2 is a graph showing the result of the Raman spectroscopy analysis. As shown in FIG. 2, pointed peaks were observed at 1592 cm$^{-1}$ (main peak) and 1569 cm$^{-1}$ (shoulder peak) in the high frequency zone. The Raman dual signal can be attributed to the tangential stretch mode of the C—C bonds of the single-wall carbon nanotubes.

Meanwhile, the broad peak in the 1346 cm$^{-1}$ zone ("D-band") indicates a random graphite layer. The broad peak which is seen at 170~180 cm$^{-1}$ seems to correspond to the "breathing mode" of the single-wall carbon nanotubes (see: A. M. Rao, E. Richter, S. Bandow, B. Chase, P. C. Eklund, K. A. Williams, S. Fang, K. R. Subbaswamy, M. Menon, A. Thess, R. E. Smalley, G. Dresselhaus, and M. S. Dresselhaus "Diameter-Selective Raman Scattering from Vibrational Modes in Carbon Nanotubes", Science 275, 187 (1997)).

Figure 3A:
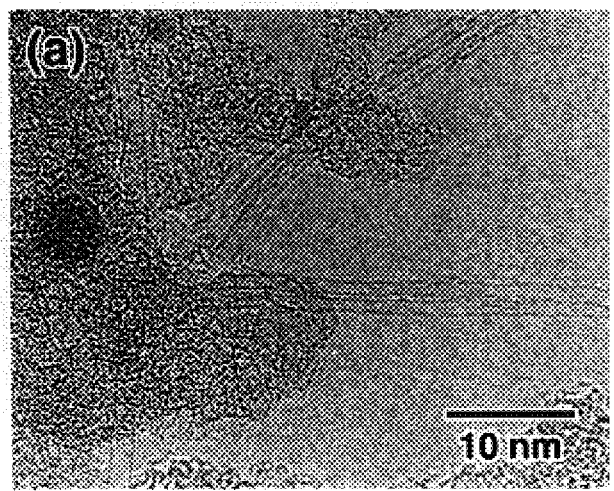
FIG. 3A is a photograph showing an HRTEM (High Resolution Transmission Electron Microscopy) observation result of the carbon nanotubes which were generated according to the manufacturing method in accordance with the embodiment of the present invention, in which the formation of single-wall carbon nanotubes in bundle-like structure is shown.
Figure 3B:
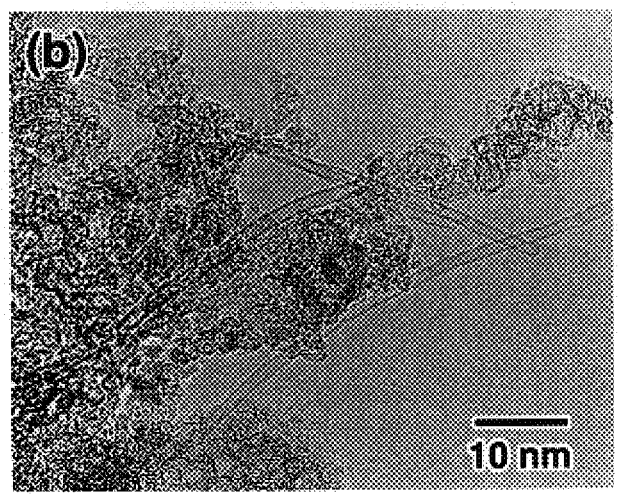
FIG. 3B is a photograph showing an HRTEM observation result of the carbon nanotubes which were generated according to the manufacturing method in accordance with the embodiment of the present invention, in which the formation of independent single-wall carbon nanotubes (not in the bundle-like structure) is shown.

FIGS. 3A and 3B are photographs showing HRTEM (High Resolution Transmission Electron Microscopy) observation results of the carbon nanotubes which were obtained in the above experiment. As seen in FIG. 3A, a considerable amount of single-wall carbon nanotubes in bundle-like structure could be obtained. The total yield of the single-wall carbon nanotubes from the soot inside the quartz tube 6 was about 5%, which was a little lower than that of the case of the 1200° C. process (high temperature process). The average of the number of single-wall carbon nanotubes included in each bundle was smaller than 10. The diameter of each single-wall carbon nanotube was 1.2~1.3 nm, which was a little smaller than that of the case of the 1200° C. process (high temperature process).

Some of the single-wall carbon nanotubes were formed independently (apart from each other, not in the bundle-like structure) as shown in FIG. 3B. The independently-formed single-wall carbon nanotubes had dome-shaped caps at their ends.

As is clear from the above concrete example, by the formation of more appropriate precursors and the selection of proper catalysts, the formation of the single-wall carbon nanotubes can be controlled suitably, and thereby the formation of the single-wall carbon nanotubes in a low temperature process is made possible.

As set forth hereinabove, in the manufacturing method of carbon nanotubes and the laser irradiation target for the manufacture of the carbon nanotubes in accordance with the present invention, carbon molecules having the 5-memberd carbon ring bonds (bonds of the 5-memberd carbon rings (the pentagons of the fullerenes ($C_{60}$, $C_{70}$, $C_{76}$, etc.))) are included at least in part of the Easer irradiation target 2. Carbon molecules having curved surfaces, such as carbon molecules having the fullerene bonds, are preferably used in the laser irradiation target 2 of the present invention. As the carbon molecule having the fullerene bonds, a carbon molecule having a spherical surface, such as the $C_{60}$ molecule, is preferably used. By use of such a laser irradiation target 2 in a laser ablation process, the single-wall carbon nanotubes can be formed efficiently in a low temperature process (at 400° C., for example). Catalysts such as Ni and Co (Ni+Co: 5 at %, for example) are preferably used for the efficient formation of the single-wall carbon nanotubes. The manufacturing method can be conducted by use of simple production equipment such as a short pulsewidth laser ablation apparatus, therefore, the production of the single-wall carbon nanotubes can be conducted efficiently with a low cost.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A laser irradiation target for the manufacture of carbon nanotubes by laser ablation, said target comprising:
   a fullerene powder; and
   a catalyst powder pressed together with said fullerene powder to form a pellet,
   wherein said laser irradiation target comprises said catalyst powder in a range of 4.5 at % and 5.5 at %.

2. The laser irradiation target according to claim 1, wherein said catalyst powder comprises Ni and Co.

3. The laser irradiation target according to claim 1, wherein said pellet comprises a diameter of about 1 cm. and a thickness of 5 mm.

4. The laser irradiation target as claimed in claim 1, wherein said fullerene powder comprises a $C_{60}$ fullerene.

5. The laser irradiation target as claimed in claim 1, wherein said catalyst powder comprises one of Ni and Co.

6. The laser irradiation target as claimed in claim 1, wherein said catalyst powder comprises a transition metal.

7. The laser irradiation target as claimed in claim 1, wherein said laser irradiation target comprises about 5 at % catalyst powder.

8. The laser irradiation target according to claim 1, wherein said catalyst powder comprises a Ni catalyst.

9. The laser irradiation target as claimed in claim 1, wherein said catalyst powder comprises a Co catalyst.

10. A laser irradiation target for the manufacture of carbon nanotubes by laser ablation, said target comprising:
    a fullerene powder; and
    a catalyst powder pressed together with said fullerene powder to form a pellet,
    wherein said laser irradiation target forms a carbon nanotube when subjected to laser ablation, and
    wherein said catalyst powder comprises Co in a predetermined range of at %.

11. The laser irradiation target as claimed in claim 10, wherein said fllerene powder comprises pure polycrystalline powder of $C_{60}$ fullerene.

12. The laser irradiation target as claimed in claim 10, wherein said catalyst powder further comprises Ni.

13. The laser irradiation target as claimed in claim 10, wherein said laser irradiation target comprises about 5 at. % catalyst powder.

14. A laser irradiation target comprising:
    a fullerene powder; and
    a catalyst powder combined with said fullerene powder to form a solid unit,
    wherein said laser irradiation target comprises said catalyst powder in a range of 4.5 at % and 5.5 at %, and
    wherein said target forms a carbon nanotube when subjected to a laser ablation.

15. A laser irradiation target, comprising:
    a three dimensional structure of carbon atoms having a plurality of 5-member carbon rings and a substantially hollow truncated-icosahedron geometric shape; and
    a catalyst powder mixed with said three dimensional structure to form a solid unit having the catalyst powder in a range of 4.5 at % to 5.5 at %.

* * * * *